United States Patent
Markefka et al.

(10) Patent No.: US 9,009,056 B2
(45) Date of Patent: Apr. 14, 2015

(54) VOICE DIALOG SYSTEM WITH REJECT AVOIDANCE PROCESS

(75) Inventors: Guntbert Markefka, Wolfsburg (DE); Klaus Dieter Liedtke, Nienburg (DE)

(73) Assignee: Deutsche Telekom AG, Bonn (DE)

( * ) Notice: Subject to any disclaimer, the term of this patent is extended or adjusted under 35 U.S.C. 154(b) by 446 days.

(21) Appl. No.: 13/061,571

(22) PCT Filed: Aug. 6, 2009

(86) PCT No.: PCT/EP2009/005704
§ 371 (c)(1),
(2), (4) Date: Apr. 8, 2011

(87) PCT Pub. No.: WO2010/028723
PCT Pub. Date: Mar. 18, 2010

(65) Prior Publication Data
US 2011/0178797 A1    Jul. 21, 2011

(30) Foreign Application Priority Data
Sep. 9, 2008  (DE) .................. 10 2008 046 431

(51) Int. Cl.
*H04M 3/42*       (2006.01)
*G10L 21/00*      (2013.01)
*G10L 25/00*      (2013.01)
*G10L 15/22*      (2006.01)
*H04M 3/493*      (2006.01)
*G10L 15/26*      (2006.01)
*H04M 3/53*       (2006.01)
*H04M 3/523*      (2006.01)

(52) U.S. Cl.
CPC .............. *G10L 15/22* (2013.01); *G10L 15/265* (2013.01); *H04M 3/42195* (2013.01); *H04M 3/4936* (2013.01); *H04M 3/53* (2013.01); *H04M 3/5231* (2013.01)

(58) Field of Classification Search
CPC .......... H04M 3/42195; H04M 3/5231; H04M 2250/74; G10L 15/265; G10L 15/22
USPC ................. 704/231, 270, 270.1, 275
See application file for complete search history.

(56) References Cited

U.S. PATENT DOCUMENTS

| | | | |
|---|---|---|---|
| 5,309,505 A * | 5/1994 | Szlam et al. ............... | 379/88.01 |
| 6,170,011 B1 * | 1/2001 | Macleod Beck et al. ..... | 709/224 |
| 6,185,535 B1 * | 2/2001 | Hedin et al. .................. | 704/270 |
| 6,654,815 B1 * | 11/2003 | Goss et al. ...................... | 709/248 |
| 6,907,111 B1 * | 6/2005 | Zhang et al. ............... | 379/88.02 |
| 6,910,072 B2 * | 6/2005 | Macleod Beck et al. ..... | 709/224 |
| 6,947,543 B2 * | 9/2005 | Alvarado et al. ........ | 379/266.01 |
| 7,068,774 B1 * | 6/2006 | Judkins et al. ........... | 379/265.01 |
| 7,412,042 B2 | 8/2008 | Henry | |

(Continued)

FOREIGN PATENT DOCUMENTS

JP  2002140243  *  5/2002 .............. G06F 3/16

*Primary Examiner* — Matthew Baker
(74) *Attorney, Agent, or Firm* — Andrew Wilford

(57) ABSTRACT

The invention relates to a process for operating a voice dialog system and a voice dialog system which can be controlled over a telecommunications link by a communications terminal, a speech element transmitted by the communications terminal being received by a receiving unit of the voice dialog system and being analyzed for statement content in a processing unit, the speech element being filed in a memory assigned to the processing unit and after the telecommunications link is broken being analyzed by the processing unit.

8 Claims, 3 Drawing Sheets

(56) References Cited

U.S. PATENT DOCUMENTS

Figure 1:
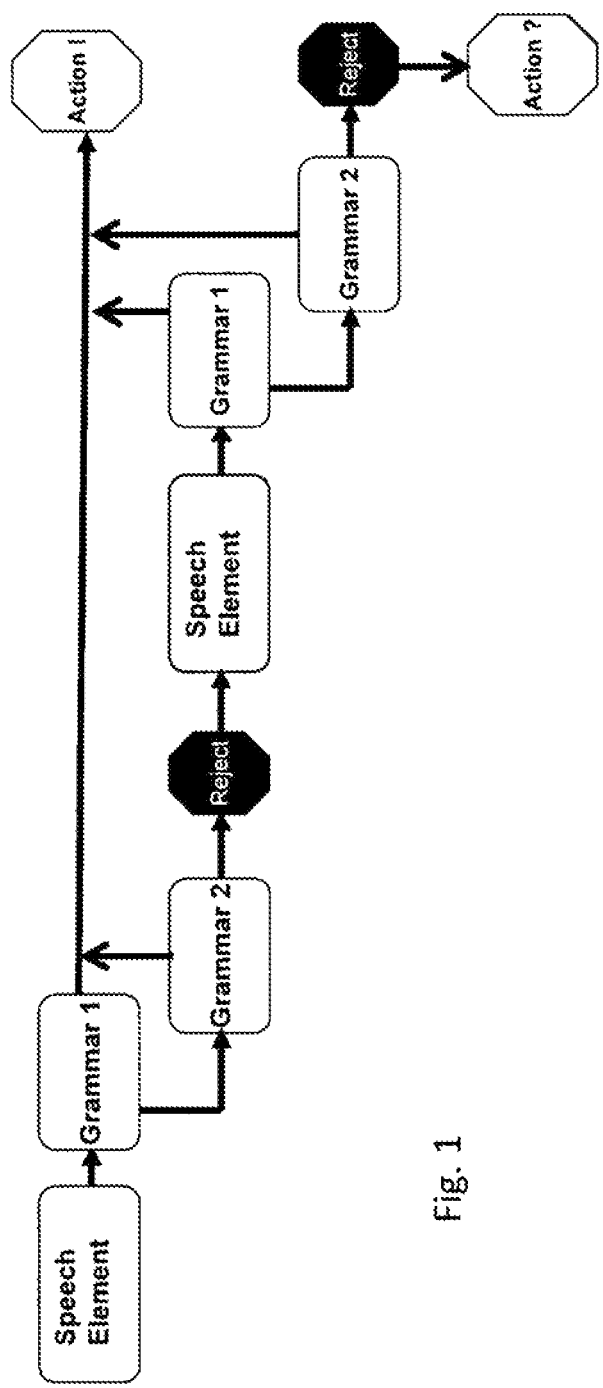

| | | | |
|---|---|---|---|
| 7,447,635 B1* | 11/2008 | Konopka et al. | 704/275 |
| 7,460,652 B2* | 12/2008 | Chang | 379/88.18 |
| 7,706,520 B1* | 4/2010 | Waterson et al. | 379/265.06 |
| 7,729,490 B2* | 6/2010 | Hemm et al. | 379/265.02 |
| 7,995,740 B2* | 8/2011 | Busey et al. | 379/265.02 |
| 8,086,454 B2* | 12/2011 | Bhardwaj et al. | 704/235 |
| 8,145,494 B2* | 3/2012 | Horioka et al. | 704/275 |
| 8,155,297 B1* | 4/2012 | Dhir et al. | 379/210.01 |
| 8,185,399 B2* | 5/2012 | Di Fabbrizio et al. | 704/275 |
| 8,300,798 B1* | 10/2012 | Wu et al. | 379/265.11 |
| 8,355,920 B2* | 1/2013 | Gopinath et al. | 704/270 |
| 8,472,612 B1* | 6/2013 | Goringe et al. | 379/266.01 |
| 8,488,774 B2* | 7/2013 | Mahalaha et al. | 379/265.13 |
| 2001/0011366 A1* | 8/2001 | Beck et al. | 717/1 |
| 2001/0025309 A1* | 9/2001 | Macleod Beck et al. | 709/223 |
| 2002/0091726 A1* | 7/2002 | Macleod Beck et al. | 707/501.1 |
| 2003/0007627 A1* | 1/2003 | Elsey et al. | 379/265.01 |
| 2003/0064716 A1 | 4/2003 | Gailey et al. | |
| 2003/0216918 A1 | 11/2003 | Toyama | |
| 2004/0042591 A1* | 3/2004 | Geppert et al. | 379/88.01 |
| 2004/0161097 A1* | 8/2004 | Henry | 379/266.02 |
| 2005/0010407 A1* | 1/2005 | Jaroker | 704/235 |
| 2005/0060638 A1* | 3/2005 | Mathew et al. | 715/500 |
| 2005/0069102 A1* | 3/2005 | Chang | 379/88.18 |
| 2006/0149544 A1* | 7/2006 | Hakkani-Tur et al. | 704/236 |
| 2006/0256949 A1* | 11/2006 | Noble, Jr. | 379/265.01 |
| 2007/0208570 A1 | 9/2007 | Bhardwaj et al. | |
| 2007/0280460 A1 | 12/2007 | Harris | |
| 2008/0140398 A1* | 6/2008 | Shpigel | 704/235 |
| 2009/0086953 A1* | 4/2009 | Vendrow | 379/207.02 |

* cited by examiner

VOICE DIALOG SYSTEM WITH REJECT AVOIDANCE PROCESS

CROSS REFERENCE TO RELATED APPLICATIONS

This application is the US-national stage of PCT application PCT/EP2009/005704, filed 6 Aug. 2009, published 18 Mar. 2010 as WO2010/028723, and claiming the priority of German patent application 102008046431.7 itself filed 9 Sep. 2008.

FIELD OF THE INVENTION

The invention relates to a process for operating a voice dialog system that can be controlled over a telecommunications link by a communications terminal, a speech element transmitted by the communications terminal being received by a receiving unit of the voice dialog system and being analyzed for statement content in a processing unit. Furthermore the invention relates to a voice dialog system in which this generic process is used.

BACKGROUND OF THE INVENTION

Voice dialog systems are used in telecommunications networks, especially in the fixed network and cell phone network domain to route a caller in a dedicated manner through a complex service offering. The caller can use for example a fixed network telephone or mobile phone as a communications terminal. A call of the caller is accepted by a voice dialog system and processed such that questions are posed to the caller fully automatically using natural speech in order to determine what the caller wants. The caller can carry on partially or fully automated dialogs with the voice dialog system that is also called a "voice portal."

An especially simple form of the voice dialog system in the form of individual word recognition that is also called interactive voice response (IVR) is common. Using the IVR simple voice navigation in telephone systems is possible. For example the caller is questioned as follows by the voice dialog system:

"If your request relates to a bill, please say bill."
"If your request relates to a complaint, please say complaint."
"If you would like to talk to a representative, please say representative."

After the voice dialog system has posed all questions, it awaits a voice input of the caller. The caller thereupon expresses himself verbally, his disclosing to the voice dialog system via the telephone a speech element in the form of a word. At this point a speech recognition process takes place automatically.

This speech recognition process is based on signal comparison of the specific acoustic caller statement with words filed as speech elements. If agreement of the transmitted speech element with a filed word can be ascertained, the statement is considered recognized and can trigger a fixed action in the voice dialog system. For example the voice dialog system can pass into a submenu and from it other headings of the submenu can pose pertinent questions. Alternatively the voice dialog system can also directly initiate a certain service after statement recognition, the caller leaving the voice dialog system.

When the caller statement is not recognized, in the current voice dialog system a user-unfriendly "reject" is executed that is reflected in a statement of the voice dialog system of the following form: "Unfortunately I was not able to understand you, please repeat." The voice dialog system requires a repeated voice input. For the caller the repeated statement is burdensome and leads to his having to remain longer in the dialog system. The caller thus becomes impatient and dissatisfied; this can lead to the operator of the speech portal losing the caller as a customer or potential customer.

OBJECT OF THE INVENTION

It is therefore the object of the invention is to make available a process for operating a voice dialog system and a voice dialog system that in the case of customer statements that are difficult to understand ensures reliable and targeted processing of the request of the caller without necessarily having the user repeat his statement and thus remaining involuntarily and unpleasantly long in the voice dialog system.

SUMMARY OF THE INVENTION

This object is achieved according to the invention in a process for operating a voice dialog system is suggested that by way of the telecommunications link can be connected to a communications terminal and can be controlled by the communications terminal, a speech element transmitted by the communications terminal being received by a receiving unit of the voice dialog system and being analyzed for statement content in a processing unit, and the speech element being filed in a memory assigned to the processing unit and after the telecommunications link is broken being analyzed by the processing unit.

The core idea of this invention consists in that the voice dialog system analyzes the request of a caller in his absence. This takes place in a back end process and is achieved by the voice message being analyzed after the telecommunications link is broken. In contrast to dialog operation of the voice dialog system that is characterized by a "question-answer scenario" and is also called "synchronous operation", in which the analysis of a speech element transmitted by the caller takes place directly, i.e. while he is connected to the voice dialog system, analysis of the received speech element according to the invention takes place only after the telecommunications link is broken, i.e. in asynchronous operation. The time expenditure for analysis in this case does not burden the caller. Therefore he need not wait until the voice dialog system has found agreement in order to then answer a repeated question of the voice dialog system. Rather recognition of the request of the caller takes place by analysis of a voice message without the presence of the caller. He thus saves time and is satisfied and content by the acceptance of his request.

In one advantageous development of the invention the speech element is converted into a text in a text synthesis unit, this text being analyzed for statement content. Making available high success-oriented analysis quality can be achieved by this text-based analysis of the speech element. This is enabled by conversion of the speech element into text (speech-to-text). Such "text-to-speech" conversion enables simpler handling of the voice message and application of search algorithms for analysis. Furthermore the text-rendered voice message can be easily processed, for example transferred as a SMS (short message service) to a corresponding analysis means.

According to the invention, the speech element can be converted into text directly after filing in the memory. Other upstream analysis steps are thus avoided and the recognition process is quickly processed efficiently in time.

Alternatively the speech element can first be compared to a speech element filed in a memory assigned to the processing unit and can be converted into text only in the absence of agreement. Then, analysis of the speech element is done first with conventional means, for example acoustic word and expression recognition, and conversion into a text is done only when assignment to a filed term cannot be ascertained. Conversion can take place directly. Since due to high analysis quality the analysis process according to the invention is more time-consuming and technology-intensive than conventional word recognition, in this way easily understandable speech elements can be filtered out with conventional word recognition so that only speech elements that are difficult to understand in terms of content are sent to back end analysis.

In a speech element that is transmitted from the communications terminal to the dialog system the caller can formulate a term. But it is especially advantageous in the process according to the invention when the speech element is a voice message that comprises several spoken words.

The caller can thus express his entire request; in a voice dialog system with individual word recognition this is not possible since in this case as the speech elements only individual words can be accepted by the voice dialog system. In contrast to conventional individual word recognition, the caller can express his request in the form of one or more entire sentences, and this sentence or these sentences can be analyzed, especially can be examined by text-based analysis for statement content. Since this is more time-consuming than direct individual word recognition, analysis after the telecommunications link is broken is especially customer-friendly since the caller need not remain "on the line" until the voice dialog system has recognized his request.

In another alternative version, according to the invention in the absence of agreement of this speech element with a filed speech element another speech element can be transmitted from the communications terminal and can be converted into text. This enables the speech element to be first an individual term in which individual word recognition can be done, then when the term is not recognized however another speech element can be recorded and analyzed that can represent a voice message that comprises several words, especially one or more sentences.

Preferably the voice dialog system after establishing a lack of agreement can indicate the possibility of transmitting and recording a voice message so that rejection of the customer by a reject does not take place. This notification can for example have the following form: "Please state your request now." This notification replaces the aforementioned reject so that irritation of the caller by insinuation of unclear pronunciation is avoided. A caller is thus notified of the possibility of formulating his request without confronting him with a reject and thus irritating him. Before recording the voice message, the voice dialog system can ask whether the caller would like to leave a corresponding request. The voice dialog system can await voice input after indicating the possibility of transmitting a voice message, recording of the voice message only taking place when a positive voice input is obtained. This voice input can be initiated for example by the following question: "Would you now like to make your request? Please say yes or no." The possibility of the recording of a voice message in the voice dialog system can consequently be part of a submenu that is initiated only by a positive voice input, i.e. by communicating the speech element "yes" to the voice dialog system. In this way it is possible for the voice dialog system to make available memory resources for receiving a voice message as needed. Furthermore, in this way an operating case is avoided in which the caller unintentionally ends up in the recording phase for the voice message and unnecessarily expends times and patience.

In another advantageous development of the invention the voice dialog system can transmit a service promise to the communications terminal or the caller after conversion of the voice element into text. The service promise is a notification that indicates with the voice dialog system that it has received the voice message and it is being processed as quickly as possible. A service promise according to the invention can be such that it is communicated to the communications terminal or the caller that contact will soon be established with it or him. After receiving this service promise the caller can calmly break the telecommunications connection and wait for repeated establishment of contact by the voice dialog system or a service representative.

Preferably it can be provided that the voice message is transmitted to an analysis unit in which it is examined for content. The request of the caller can be established by this examination for content. This can preferably take place by the voice message being examined text-based for the occurrence of one or more certain terms. These certain terms can be keywords that constitute an indication of the request of the caller. If one or more of these keywords are found in the voice message, assignment of the voice message to a certain topic can take place. For example, in the case of the occurrence of the term "bill" the voice message can be assigned to the topic "questions about your telephone bill." Based on this assignment of the voice message or of the request that is the subject of the voice message, a certain service or service representative who is responsible for a certain topic can establish contact in a dedicated manner with the communications terminal or the caller.

This can preferably take place in that after determining the topic a telecommunications link with the telecommunications terminal is established. With this process step the service promise given beforehand is initiated. In this way especially high customer satisfaction is achieved.

Preferably the communications terminal after analysis of the speech element or voice message can be connected to a service representative or again to the voice dialog system. Direct connection to a service representative has the advantage that a real individual can directly accept and handle the request of the caller so that there is no further time delay in the handling of the request. But if analysis of the voice message has yielded only assignment to a higher-order topic, so that optionally specification of the request is necessary within this special topic, for time optimization the communications terminal can be connected again to the voice dialog system that then can be started especially in a submenu. This ensures that an improperly qualified service representative is not connected first to the communications terminal, but immediately assignment to the correct service representative or service takes place.

According to the invention, there is furthermore a voice dialog system that can be controlled over a telecommunications link by a communications terminal, with a receiving unit by means of which a speech element transmitted from the communications terminal can be received, and with a processing unit by means of which the speech element can be analyzed for statement content, the processing unit being assigned a memory in which the speech element can be filed, and the processing unit being set up to analyze the received speech element after the telecommunications link is broken. This voice dialog system is suited to executing the described process according the invention, and to avoiding the adverse reject in conventional voice dialog systems so that high customer satisfaction is achieved.

In one advantageous development, the voice dialog system can have a text synthesis unit that can convert the speech element into a text. Text-based analysis of the speech element is thus enabled.

Furthermore, the voice dialog system can have suitable means so that it is set up for execution of the process according to the invention.

In particular the voice dialog system can have recording means for the recording of a speech element or a voice message. The memory can be connected to the recording means here.

Preferably the processing unit can have an analysis means that is set up to examine the speech element or voice message for the occurrence of certain terms and then to assign them to at least one certain topic, i.e. to classify the speech element or voice message. As already described, this facilitates processing of the voice message and handling of the request of the caller since by assignment of the voice message to a certain topic the core aspect of the request is determined and on this basis the competent service or service representative can establish contact in a dedicated manner with the communications terminal or the caller.

Other advantages and features of the invention can be taken from the following description of embodiments and the figures.

Figure 2:
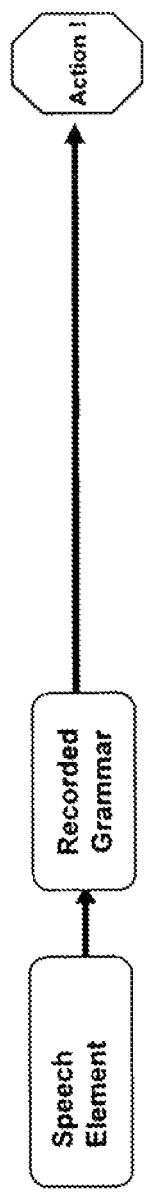
Figure 3:
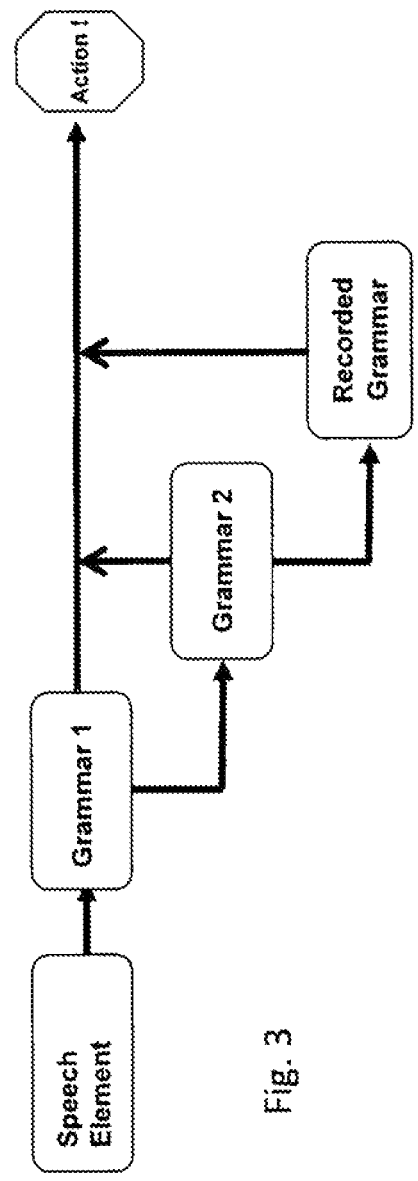
Figure 4:
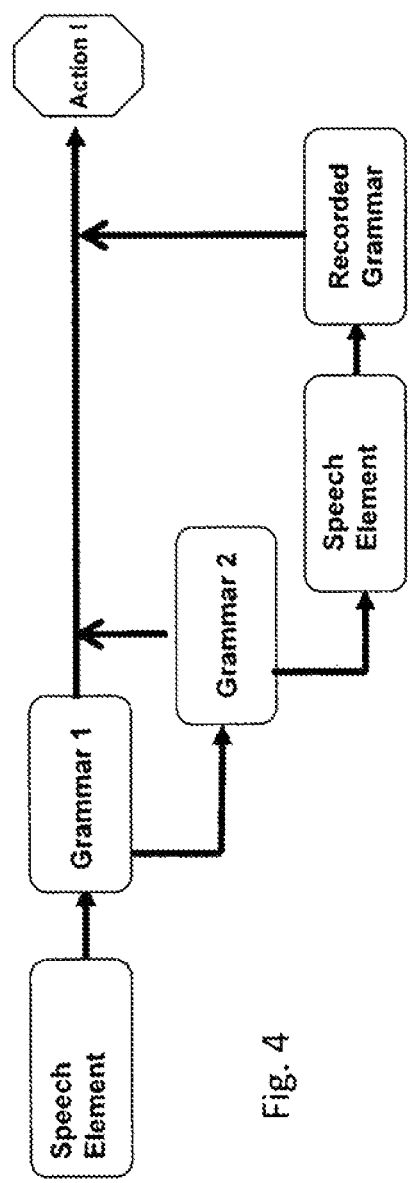

FIG. 1 shows a schematic of dialog with a voice dialog system according to the prior art FIG. 2 shows a schematic flow chart of a first version of a voice dialog system according to the invention with reject avoidance process FIG. 3 shows a schematic flow chart of a second version of a voice dialog system according to the invention with reject avoidance process FIG. 4 shows a schematic flow chart of a third version of a voice dialog system according to the invention with reject avoidance process.

FIG. 1 shows a schematic of the individual steps in a conventional voice dialog system. If a caller with a fixed network telephone or cell phone dials a voice dialog system, it will pose a question to the caller that the caller answers with a corresponding statement. The statement is transmitted by the telephone to the voice dialog system. The customer statement constitutes a speech element that is compared by the voice dialog system to a filed word "grammar V. If signal analysis of the acoustic speech element does not establish content agreement with the filed word, checking for agreement of the speech element with a second filed word "grammar 2" takes place. If content agreement in signal analysis cannot be established, either the voice dialog system outputs a "reject" in a form in which the caller is asked to repeat his statement. Then the caller repeats his statement that is transmitted from the telephone to the voice dialog system as another speech element. At this point this second speech element is first compared to the first filed word "grammar 1" and for nonagreement, to the second filed word "grammar 2." If in this second attempt agreement cannot be established between the customer statement and the filed word, a request for repetition of the customer statement takes place or the caller is connected to a service representative. Since however the latter is not specialized in a certain topical area, forwarding to a competent service representative is always necessary. The caller's patience is thus unnecessarily tested and he wastes avoidable time in the voice dialog system.

FIG. 2 shows a first version of the process according to the invention. It is provided that the speech element that is pronounced by the caller and that can be an individual term or a sequence of terms can be especially one or more sentences, is received by the voice dialog system, recorded and converted directly into a text in a text synthesis unit. The speech element converted into a text or the converted voice message is called "recorded grammar" in FIGS. 2-4.

FIG. 3 shows a second version of the process according to the invention. Here the speech element is first compared to filed words or expressions "grammar 1" and "grammar 2." Only when assignment to one of the filed terms cannot be found is the speech element converted into a text "recorded grammar." It is not necessary to repeat the originally expressed speech element again.

FIG. 4 shows a third version of the process according to the invention. It differs from the process as shown in FIG. 3 in that in the absence of agreement of the speech element with the filed speech elements "grammar 1" and "grammar 2" another speech element is accepted by the voice dialog system. This speech element is in turn converted into a text "recorded grammar."

In execution steps that are not shown the converted speech element in the described version is analyzed in a text-oriented manner, analysis taking place such that the text is examined for the occurrence of at least one certain term and in the case in which this term is found is classified accordingly. Then the voice dialog system establishes contact with the telephone or the caller and connects to a service, a service representative or again to a submenu of the voice dialog system.

The process of the invention can be described as follows:

If during a synchronous voice interaction of a caller with the voice dialog system (IVR system) a self-service transaction has not completed, the caller can ultimately leave his request to the system in the form of a voice message. The IVR system then takes leave of the customer with a service promise. From the standpoint of the system, the recorded request of the caller is converted into text with a "recorded grammar" that can also be called "speech-to-text", independently of the speaker and automatically, i.e. without the collaboration of human transcription, and is sent to the corresponding back end processes. Afterwards continued asynchronous processing, especially analysis of the voice message, takes place.

The quality of the automatic "recorded grammar" processing can be achieved with the best recognition on the market with achievement of especially high analysis quality so that on the text level the core request of the caller can be quickly identified and classified by the voice dialog system or by a back end process connected to the latter. The customer-unfriendly "reject" in the case of incomprehensible customer statements is thus avoided.

The "reject avoidance process" for speech portals is especially customer-friendly since caller requests can no longer be lost, burdensome waiting in a queue and within the voice dialog system is avoided and callback of the caller by representatives guaranteed to be competent can be ensured.

The reject avoidance process is based on the fact that instead of rejecting a customer request that has not been understood by the voice recognition in a synchronous voice-user interface mode (reject), it is instead recorded, automatically converted into text and further processed in an asynchronous mode. The burden on the computers necessary for this purpose thus varies in the conventional magnitudes of digital voice recording, the amount of data being different depending on the compression rate. The average value for compression can be 1:1 audio compression that is sufficient for electronic conversion into text. The latency times that are necessary for analysis of a speech element in synchronous operation of the voice dialog system need not be considered for the asynchronous mode. In the case of "recorded grammar" the service promise is important to the customer since in this way customer satisfaction is increased. Callback and clarification of the caller's request within the promised time interval by the voice dialog system or by a service or service representative ensure rounding off of the service offered by the voice dialog system that is satisfactory to the customer.

The invention claimed is:

1. A process for operating a voice dialog system that can be controlled over a telecommunications link by a communications terminal, the process comprising the steps of:
  transmitting a first or second speech element with the communications terminal;
  receiving the first or second speech element with a receiving unit of the voice dialog system;
  filing the first or second speech element in a memory of a processing unit;
  converting the first or second speech element into text by a speech-to-text unit;
  transmitting a service promise to the communications terminal after conversion of the first or second speech element into text;
  breaking the telecommunications link and then analyzing the first or second speech element for statement content with the processing unit by
    examining the converted speech element for the occurrence of at least one predetermined term, and,
    if the term is found, assigning the term to a predetermined topic;
  establishing a telecommunications link to the communications terminal with the voice dialog system; and
  connecting the communications terminal to a service, a service representative, or the voice dialog system.

2. The process as claimed in claim 1, further comprising the steps of:
  before converting the first speech element, comparing the first speech element to a speech element filed in a memory assigned to the processing unit; and
  if the system is unable to interpret the first speech element, converting the first speech element into text.

3. The process as claimed in claim 1, wherein the first speech element is a voice message comprising several spoken words.

4. The process as claimed in claim 1, further comprising the step of:
  before converting the first speech element, comparing the first speech element to a speech element filed in a memory assigned to the processing unit; and if the system is unable to interpret as an acceptable dialog command,
    transmitting the second speech element by the communications terminal and
    converting the second speech element into text.

5. The process as claimed in claim 4, wherein the second speech element is a voice message comprising several spoken words.

6. The process as claimed in claim 5, wherein after establishing a lack of agreement the voice dialog system indicates the possibility of transmitting a voice message.

7. The process as claimed in claim 6, wherein, after asking the customer to repeat him/herself, the voice dialog system awaits a voice input and records the voice message only when a positive voice input is obtained.

8. A voice dialog system for carrying out the method of claim 1 and that can be controlled over a telecommunications link by a communications terminal, the system comprising:
  a receiving unit by means of which a speech element transmitted from the communications terminal can be received,
  a speech-to-text unit that can convert the speech element into text, and
  a processing unit for analyzing the speech element for statement content, having a memory in which the speech element can be filed, and being set up to analyze the received speech element after the telecommunications link is broken, the voice dialog system being configured to transmit a service promise to the communications terminal after conversion of the first or second speech element into text.

* * * * *